3,632,684
GRAFT COPOLYMER WITH A BACKBONE CONTAINING TETRAHYDROBENZYL ACRYLATE
Pierre Tellier and Edouard Grimaud, Oullins, France, assignors to Ugine Kuhlmann, Paris, France
No Drawing. Filed Mar. 21, 1969, Ser. No. 809,399
Claims priority, application France, Aug. 21, 1968, 163,589
Int. Cl. C08f 15/40
U.S. Cl. 260—881
12 Claims

ABSTRACT OF THE DISCLOSURE

A graft copolymer is produced by forming an interpolymeric chain to serve as the backbone of the graft copolymer, this chain being an interpolymer of two successively emulsion-polymerized groups of monomers of which the first, constituting 40 to 95 parts of 100 parts by weight of the interpolymer, includes 70% to 99.99% by weight of at least one acrylic acid ester of a $C_1$–$C_8$ aliphatic alcohol and 0.01% to 2% by weight of at least one compound containing two copolymerizable double bonds and, optionally, 0% to 29.99% by weight of one or more copolymerizable monomers; and the second, constituting 5 to 60 parts of 100 parts by weight of the interpolymer, includes 50% to 98% by weight of at least one acrylic acid ester of a $C_1$–$C_8$ aliphatic alcohol, 2% to 30% by weight of at least one cycloalkenyl ester having the following formula:

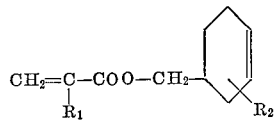

wherein $R_1$ and $R_2$ each is a hydrogen atom or a methyl group and, optionally, 0% to 2% by weight of the mentioned twice-double-bonded copolymerizable compound and 0% to 30% by weight of the mentioned copolymerizable monomers. Thereafter, side polymeric chains are grafted on by polymerizing the interpolymeric chain in emulsion with either (a) 70 to 100 parts by weight of methyl methacrylate and, optionally, 0 to 30 parts by weight of at least one copolymerizable monomer or (b) 60 to 100 parts of a vinyl aromatic compound and, optionally, 0 to 40 parts of a coplymerizable ethylenic nitrile and 0 to 30 parts of the mentioned copolymerizable monomers, the interpolymeric chain constituting 10% to 85% of the weight of the graft copolymer.

BACKGROUND OF THE INVENTION

This invention relates to a graft copolymer having as its backbone an interpolymeric chain which comprises an interpolymer of two successively emulsion-polymerized groups of monomers and having side polymeric chains grafted by emulsion polymerization onto the backbone, so as to achieve improvements in the molecular weight and particle size of the graft copolymer and in the compatability of the graft copolymer with other molding resins.

In United States patent application Ser. No. 720,405, filed Apr. 10, 1968, now U.S. Pat. 3,517,084, and assigned to the owner of the present application, graft copolymers having improved resistance to aging are described as being prepared by polymerizing 25 to 95 parts of a mixture of monomers comprising chiefly methyl methacrylate or one or more vinyl aromatic monomers such as styrene, and optionally one or more ethylene nitriles such as acrylonitrile, in the presence of 5 to 75 parts of an interpolymeric backbone chain comprising primarily a copolymer of at least one acrylic acid ester of a $C_1$–$C_8$ aliphatic alcohol and at least one cycloalkenyl ester having the formula:

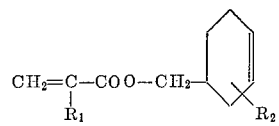

wherein $R_1$ and $R_2$ each is a hydrogen atom or a methyl group.

Such graft copolymers can be used alone for molding, such as by extrusion or injection molding, or in combination with other polymers such as polystyrene, poly-α-methyl styrene, polyacrylonitrile, polymethacrylonitrile, polymethyl methacrylate, polyacrylates or their copolymers. In general, the greater the proportion of the graft copolymer in such combinations, the greater will be the impact strength of an article molded therefrom.

In grafting the polymeric side chains onto the interpolymeric backbone chain, any of the known methods of polymerization in mass, suspension or emulsion may be used. Emulsion polymerization is often preferable due to its flexibility and also because it results in graft copolymers which, when molded by injection or extrusion, produce moldings having particularly good surface appearance. In such case, it is desirable, in order to preserve good impact strength, to use an emulsion-produced latex of graft copolymer which is characterized by a relatively high molecular weight and by relatively coarse particles.

These two properties are difficult to achieve when preparing the graft copolymers described in the aforesaid patent application, due to the fact that the cycloalkenyl ester causes chain transfer reactions during polymerization which limit the molecular weight. Another difficulty resides in the fact that combinations of the graft copolymer and other polymers containing a relatively high proportion of the graft copolymer sometimes exhibit a lack of compatibility which is manifested by the appearance of wrinkles or blisters when an article molded from the combination is bent.

SUMMARY OF THE INVENTION

We have discovered that the foregoing difficulties can be remedied by polymerizing the interpolymeric chain, which forms substantially the backbone of the graft copolymer, in two successive stages and by including in at least one of such stages a small quantity of a cross-linking agent comprising a compound having at least two polymerizable double bonds, such as divinyl benzene, allyl methacrylate or acrylate, or ethylene dimethacrylate or diacrylate. In accordance with the invention, 100 parts by weight of an interpolymeric backbone chain are formed by successively polymerizing in emulsion:

(i) In a first stage, to produce 40 to 95 parts of said 100 parts by weight, a group of monomers comprising (a) 70% to 99.99% by weight of at least one acrylic acid ester of a lower aliphatic alcohol having 1 to 8 carbon atoms, (b) 0.01% to 2% by weight of at least one compound having at least two double bonds which are copolymerizable with (a), and (c) 0% to 30% by weight of at least copolymerizable monomer, and (ii) In a second stage, to produce 5 to 60 parts of said 100 parts by weight, a group of monomers comprising (d) 50% to 98% by weight of at least one acrylic acid ester of a lower aliphatic alcohol having 1 to 8 carbon atoms, (e) 2% to 30% by weight of at least one cycloalkenyl ester having the following formula:

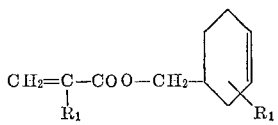

wherein $R_1$ and $R_2$ each is a hydrogen atom or a methyl group, (f) 0% to 2% by weight of at least one compound containing at least two double bonds which are copolymerizable with (d), and (g) 0% to 30% by weight of at least one copolymerizable monomer.

The side polymeric chains subsequently grafted to the interpolymeric chain by emulsion polymerization comprise (iii) polymerized linkages of (h) 70 to 100 parts by weight of methyl methacrylate which may be copolymerized with (i) 0 to 30 parts by weight of at least one copolymerizable monomer, or (iv) polymerized linkages of (j) 60 to 100 parts by weight of at least one vinyl aromatic monomer which may be copolymerized with (k) 0 to 40 parts by weight of at least one ethylenic nitrile, the amounts of (j) and (k) in said polymerized linkages (iv) being 100 parts by weight, and (l) 0 to 30 parts by weight of at least one copolymerizable monomer.

The interpolymeric chain which forms the backbone constitutes 10% to 85% of the weight of the graft copolymer.

As the (a) and (d) constituents, acrylic acid esters of methyl, ethyl, butyl, 2-ethylhexyl or hepty alcohol are preferably used.

As the (b) and (f) constituents, cross-linking agents such as divinyl benzene, allyl methacrylate or acrylate, or ethylene dimethacrylate or diacrylate are preferably used.

As the (c) and (g) constituents, monomers such as acrylonitrile, methacrylonitrile, methylene glutaronitrile, styrene, vinyl esters of saturated aliphatic acids having 1 to 18 carbon atoms, or vinyl and alkyl ethers whose alkyl moiety contains 1 to 18 carbon atoms are preferably used. The alkyl moiety of the vinyl-alkyl ethers and of the saturated aliphatic acids typically may be straight chain alkyl or branched chain alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc.

As the (e) constituent, acrylic acid or methacrylic acid esters of tetrahydrobenzyl alcohol are preferably used.

As the (i) constituent, monomers such as styrene, α-methyl styrene, acrylonitrile, methacrylonitrile, methylene glutaronitrile, methyl acrylate, or acrylic acid or methacrylic acid esters of ethyl, butyl, 2-ethylhexyl or heptyl alcohol are preferably used.

As the (j) constituent, vinyl aromatic monomers such as styrene, α-methyl styrene, halogenated styrenes or ring-alkylated styrene are preferably used. These styrenes are available commercially and any degree of halogenation or alkylation of the styrene monomer can be used. It is preferred that lower alkyl compounds, i.e., containing not more than 8 carbon atoms, be used for alkylation.

As the (k) constituent, ethylenic nitriles such as acrylonitrile, methacrylonitrile or methylene glutaronitrile are preferably used.

As the (l) constituent, monomers such as acrylic acid or methacrylic acid esters of methyl, ethyl, butyl, 2-ethylhexyl or heptyl alcohol are preferably used.

In producing the improved graft copolymer of the invention, the first stage group of monomers (i) are polymerized in aqueous emulsion in the presence of suitable emulsifiers such as anionic, nonionic or cationic compounds. The alkyl sulphates of alkaline metals as well as the alkyl aryl sulphonates and the alkaline salts of disproportioned rosin acids are among the suitable emulsifiers which may be used. The reaction products of ethylene oxide and phenols, fatty alcohols and fatty acids which are nonionic emulsifiers are also suitable.

Initiators may also be used, if desired, in which case the per-salts such as potassium persulfate and redox systems such as potassium perulfate and sodium bisulfite are preferred. The polymerization may be effected at a temperature between 0° C. and 100° C., and preferably between 40° C. and 90° C.

Following completion of the polymerization of the first stage group of monomers, the second stage group of monomers (ii) are added and polymerized in emulsion, as described above, to form the interpolymeric chain which is to form the backbone of the graft copolymer.

Finally, the monomers which provide the polymerized linkages (iii) or (iv) are added and polymerized in emulsion, as described above, to graft the polymeric side chains onto the interpolymeric backbone chain and thus form the graft copolymer of the invention.

The resultant graft copolymer may be used alone for molding such as by extrusion or injection molding or in combination with one or more polymers such as polystyrene, poly-α-methyl styrene, polyacrylonitrile, polymethyl methacrylate, polyalkyl acrylates or their copolymers. A variety of other ingredients such as lubricants, stabilizers, plasticizers, reinforcing fibers and fillers, pigments and dyes may be incorporated in the graft copolymer of this invention or in its combinations with other polymers.

Further details of the invention are set forth in the following specific examples which represent several embodiments thereof.

Example 1.—Preparation of latex of interpolymeric chain

Into a 2-liter flask maintained at 60° C., surmounted by a condenser and two funnels, equipped with a stirring device, a heating jacket and a nitrogen feed pipe, the following solution was introduced:

| | G. |
|---|---|
| Water | 187.5 |
| Potassium persulfate | 0.15 |
| Disodium hydrogen phosphate | 0.38 |

One of the funnels was filled with a mixture of 112.5 g. of butyl acrylate containing 0.2% ethylene glycol dimethacrylate, and the other was filled with the emulsifier solution (0.32 g. of lauryl sodium sulfate in 105 g. of water). After scavenging of the atmosphere of the flask with nitrogen, 11 g. of the monomer mixture were poured and then, after a 15-minute wait, the rest of the monomer mixture and ¾ of the emulsifier solution were simultaneously poured in 30 minutes. 15 minutes after the end of the pourings, the polymerization rate was 93%. The rest of the emulsifier was then poured in 30 minutes, together with the following mixture, filled previously into the funnel left free: 36 g. of butyl acrylate containing 0.2% ethylene glycol dimethacrylate and 1.5 g. of tetrahydrobenzyl acrylate.

Heating was maintained for another 3 hours. The polymerization rate was 94%.

Example 2.—Preparation of latex of interpolymeric chain

This latex was prepared by operating under conditions similar to those of Example 1, but replacing the butyl acrylate with a mixture of 60% heptyl acrylate by weight and 40% ethyl acrylate by weight, and the ethylene glycol dimethacrylate with divinyl benzene.

Example 3.—Preparation of latex of graft copolymer

The equipment described in Example 1 was used. There were successively introduced into the flask the latex obtained in Example 1, containing 150 g. of interpolymeric chain solids, and the following solution:

| | G. |
|---|---|
| Water | 150 |
| Disodium hydrogen phosphate | 1.5 |
| Potassium persulfate | 0.3 |

One of the funnels was filled with the monomers:

| | G. |
|---|---|
| Styrene | 103.5 |
| Acrylonitrile | 46.5 | and the other was filled with the emulsifier solution (1.5 g. of lauryl sodium sulfate in 300 g. of water).

The monomers and the emulsifier solution were poured at 60° C. in 3 hours and the flask was kept at that temperature for another 4 hours. A latex containing 300 g. of graft copolymer of which 50% by weight constituted the interpolymeric chain was collected.

Example 4.—Preparation of a latex of graft copolymer

The same conditions were observed as in Example 3, using the interpolymeric chain of Example 2. A latex containing 300 g. of graft copolymer with 50% interpolymeric chain was collected.

Each of the graft copolymer dispersions of Examples 3 and 4 was mixed with 1020 g. of a dispersion containing 414 g. of a styrene-acrylonitrile resin of 0.525 intrinsic viscosity, containing 26.9% acrylonitrile in the polymerized state. The resulting dispersions were coagulated by a 1% aluminum sulfate solution. The polymers collected, containing 21% by weight of interpolymeric chain, were washed, oven-dried at 90° C., treated with 3% methylene bis-stearamide by weight, mixed at 170° C. on BUSS mixer and injection molded at 220° C. The mechanical properties, measured at 23° C., were as follows:

| | Example 3 graft copolymer combined with styrene-acrylonitrile | Example 4 graft copolymer combined with styrene-acrylonitrile |
|---|---|---|
| Rockwell hardness R | 106 | 102.5 |
| Izod impact resistance (kg. cm./cm. of notch) | 13.7 | 17 |
| Tensile strength at yield point (bars) | 439 | 406 |
| Ultimate elongation, percent | 8 | 19 |

Sheets molded by injection with each of these two polymer combinations showed, on bending, no defect due to lack of compatibility.

Example 5.—Preparation of latex of single stage graft copolymer

This example and the following one are comparative examples.

Using the equipment described in Example 1, an interpolymeric chain was prepared by polymerization of the following mixture in a single stage:

| | G. |
|---|---|
| Butyl acrylate | 144 |
| Tetrahydrobenzyl acrylate | 6 |

Following the procedure of Example 3, the resulting latex was used for the preparation of a graft copolymer with 50% by weight of interpolymeric chain, which was mixed under the same conditions as Example 4 with the styrene-acrylonitrile resin.

After mixing and injection molding, the properties were as follows:

| | |
|---|---|
| Rockwell hardness R | 107 |
| Izod impact resistance (kg. cm./cm. of notch) | 8.5 |
| Tensile strength at yield point (bars) | 420 |
| Ultimate elongation, percent | 7 |

Comparison of these properties with those obtained in Example 4 demonstrates the advantage of producing the latex of the basic interpolymeric chain in two stages in accordance with the invention, rather than a single stage.

Example 6.—Preparation of graft copolymer without a cross-linking agent

The procedures described in Examples 1-4 were repeated, without using any cross-linking agent (ethylene glycol dimethacrylate or divinyl benzene), for preparing two graft copolymers with 21% by weight interpolymeric chain content, combined with styrene-acrylonitrile resin. After injection molding, the compositions exhibited properties similar to those of the polymer combinations of Examples 3 and 4, but in contrast to the latter, they had a marked tendency to flake, denoting a lack of compatibility between the styrene-acrylonitrile resin phase and the graft copolymer phase.

The invention has been described in terms of its operative principles and several illustrative embodiments thereof. Many variations in the illustrative embodiments will be obvious to those skilled in the art without departing from the essence or scope of the invention. Accordingly, the scope of the invention is to be determined by reference to the appended claims.

We claim:
1. A graft copolymer comprising:
(I) an interpolymeric chain forming substantially the backbone of said graft copolymer and comprising an interpolymer of two successively-polymerized groups of monomers (i) and (ii) which in combination constitute 100 parts by weight of said interpolymer and which comprise
  (i) of said 100 parts by weight 40 to 95 parts of a monomer group comprising
    (a) 70 to 99.99% by weight of at least one acrylic acid ester of a lower aliphatic alcohol having 1 to 8 carbon atoms; and
    (b) 0.01 to 2% by weight of at least one cross linking compound containing at least two double bonds both of which are copolymerizable with (a); and
    (c) 0 to 29.99% by weight of at least one copolymerizable monomer; and
  (ii) of said 100 parts by weight 5 to 60 parts of a monomer group comprising
    (d) 50 to 98% by weight of at least one acrylic acid ester of a lower aliphatic alcohol containing 1 to 8 carbon atoms; and
    (e) 2 to 30% by weight of at least one cycloalkenyl ester having the following formula:

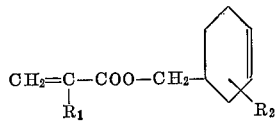

wherein $R_1$ and $R_2$ each is a hydrogen atom or a methyl group; and
    (f) 0 to 2% weight of at least one cross linking compound containing at least two double bonds both of which are copolymerizable with (d); and
    (g) 0 to 30% by weight of at least one copolymerizable monomer; and
(II) side polymeric chains grafted to said interpolymeric chain comprising
  (iii) polymerized linkages of
    (h) 70 to 100 parts by weight of methyl methacrylate copolymerized with
    (i) 0 to 30 parts by weight of at least one copolymerizable monomer; or
  (iv) polymerized linkages of
    (j) 60 to 100 parts by weight of at least one vinyl aromatic monomer copolymerized with
    (k) 0 to 40 parts by weight of at least one ethylenic nitrile, the amounts of (j) and (k) in said polymerized linkages (iv) being 100 parts by weight; and
    (l) 0 to 30 parts by weight of at least one copolymerizable monomer; and
the interpolymeric chain which forms the backbone of the graft copolymer constituting 10 to 85% of the weight of the graft copolymer.

2. A graft copolymer according to claim 1 wherein (a) and (d) each is at least one acrylic acid ester of methyl, ethyl, butyl, 2-ethylhexyl or heptyl alcohol.

3. A graft copolymer according to claim 1 wherein (b) and (f) each is at least one of divinyl benzene, allyl methacrylate or acrylate, or ethylene dimethacrylate or diacrylate.

4. A graft copolymer according to claim 1 wherein (c) and (g) each is at least one of acrylonitrile, methacrylonitrile, methylene glutaronitrile, styrene, vinyl esters of saturated aliphatic acids having 1 to 18 carbon atoms, or vinyl and alkyl ethers whose alkyl moiety contains 1 to 18 carbon atoms.

5. A graft copolymer according to claim 1 wherein (e) is at least one acrylic acid or methacrylic acid ester of tetrahydrobenzyl alcohol.

6. A graft copolymer according to claim 1 wherein (i) is at least one of styrene, α-methyl styrene, acrylonitrile, methacrylonitrile, methylene glutaronitrile, methyl acrylate, or the acrylic acid or methacrylic acid esters of ethyl butyl, 2-ethylhexyl or heptyl alcohol.

7. A graft copolymer according to claim 1 wherein (j) is at least one of styrene, α-methyl styrene, halogenated styrenes or ring-alkylated styrene.

8. A graft copolymer according to claim 1 wherein (k) is at least one of acrylonitrile, methacrylonitrile or methylene glutaronitrile.

9. A graft copolymer according to claim 1 wherein (l) is at least one acrylic acid or methacrylic acid ester of methyl, ethyl, butyl, 2-ethylhexyl or heptyl alcohol.

10. A graft copolymer according to claim 1 in combination with a polymer or copolymer of styrene, α-methyl styrene, acrylonitrile, methyl methacrylate, or alkyl acrylates.

11. A method of producing a graft copolymer which comprises:
 (a) forming the polymer group (i) according to claim 1 and polymerizing the same in emulsion; and
 (b) forming the polymer group (ii) according to claim 1 and polymerizing the same in emulsion and in the presence of polymerized group (i) to form an interpolymeric chain (I) in accordance with claim 1; and
 (c) grafting the side polymeric chains (II) according to claim 1 to (I) by polymerization in emulsion, all of said polymerizations being carried out at a temperature between 0° and 100° C.

12. A method according to claim 1 wherein all of said polymerizations are carried out at a temperature between 40° and 90° C.

References Cited
UNITED STATES PATENTS
3,517,084  6/1970  Tellier et al. _____ 260—881

FOREIGN PATENTS
1,511,011  1/1968  France _____ 260—861

PAUL LIEBERMAN, Primary Examiner

J. SEIBERT, Assistant Examiner

U.S. Cl. X.R.

260—23 P, 29.6 RB, 30.8 R, 33.4 R, 41 R, 45.7 R, 876 R, 885; 264—176 R, 182

UNITED STATES PATENT OFFICE
CERTIFICATE OF CORRECTION

Patent No. 3,632,684          Dated January 4, 1972

Inventor(s)  Pierre Tellier and Edouard Grimaud

It is certified that error appears in the above-identified patent and that said Letters Patent are hereby corrected as shown below:

Column 3, lines 3 to 6 should read:

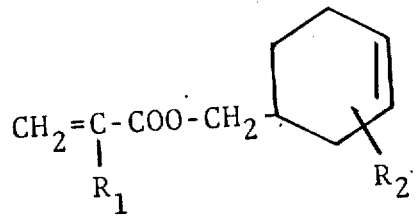

Signed and sealed this 13th day of June 1972.

(SEAL)
Attest:

EDWARD M. FLETCHER, JR.
Attesting Officer

ROBERT GOTTSCHALK
Commissioner of Patents